US005684993A

United States Patent [19]

Willman

[11] Patent Number: 5,684,993

[45] Date of Patent: Nov. 4, 1997

[54] SEGREGATION OF THREAD-SPECIFIC INFORMATION FROM SHARED TASK INFORMATION

[75] Inventor: Bryan Willman, Kirkland, Wash.

[73] Assignee: Microsoft Corporation, Redmond, Wash.

[21] Appl. No.: 632,750

[22] Filed: Apr. 16, 1996

Related U.S. Application Data

[63] Continuation of Ser. No. 365, Jan. 4, 1993, abandoned.

[51] Int. Cl.[6] .......... G06F 13/00

[52] U.S. Cl. .......... 395/677; 395/416; 395/417; 395/418; 395/419; 395/497.04; 395/676; 364/DIG. 1

[58] Field of Search .......... 395/416, 417, 395/418, 419, 497.04, 676, 677

[56] References Cited

U.S. PATENT DOCUMENTS

| | | | |
|---|---|---|---|
| 4,442,484 | 4/1984 | Childs, Jr. et al. | 395/425 |
| 4,539,637 | 9/1985 | DeBruler | 395/650 |
| 4,926,322 | 5/1990 | Stimac et al. | 395/500 |
| 4,972,338 | 11/1990 | Crawford et al. | 395/400 |
| 5,144,551 | 9/1992 | Cepulis | 395/650 |
| 5,255,379 | 10/1993 | Melo | 395/400 |
| 5,303,378 | 4/1994 | Cohen | 395/700 |
| 5,345,588 | 9/1994 | Greenwood et al. | 395/650 |

OTHER PUBLICATIONS

Intel, 80286 and 80287 Programmer's Reference Manual, 1987, pp.

Hensler, Carl & Sarno, Ken, "Marryins Unix and the 80386", Byte Apr. 88, pp. 237–244.

Heller, Vic, "OS/2 Virtual Memory Management", Byte Apr. 88, pp. 227–233.

El-Ayat, Khaled & Agarwal, Rakesh, "The Intel 80386–Architecture and Implementation", IEEE Micro, Dec. 18, pp. 4–22.

*Primary Examiner*—Frank J. Asta
*Attorney, Agent, or Firm*—Seed and Berry LLP

[57] ABSTRACT

A multi-processor system includes memory and at least two central processing units (CPUs) that may execute different threads of computation of a same task at the same time. CPU-specific data is segregated from shared task information of different threads of computation of the task. In particular, the shared task information is placed in memory locations of the memory that are directly addressable by both CPUs, and CPU-specific data are placed in memory locations that are directly addressable by only the associated CPU. No additional hardware is needed, and the memory and run-time costs of the invention are miniscule.

11 Claims, 8 Drawing Sheets

SEGREGATION OF THREAD-SPECIFIC INFORMATION FROM SHARED TASK INFORMATION

Cross-Reference to Related Application

This application is a continuation of U.S. patent application Ser. No. 08/000,365, filed Jan. 4, 1993, now abandoned.

TECHNICAL FIELD

This invention relates generally to data processing systems and, more particularly, to storage of CPU-specific data in multi-processor systems.

BACKGROUND OF THE INVENTION

The 80386 microprocessor and compatible processors, including the 80486 and Pentium, sold by Intel Corporation of Cupertino, Calif., may operate in one of at least three processor modes: real mode, protected mode or virtual-86 mode. Real mode is provided as a carry over from earlier INTEL processors and allows code written for real mode of earlier processors to be executed on the 80386. Protected mode provides mechanisms that protect data from unauthorized access, support multi-tasking and perform sophisticated memory management. Virtual-86 mode allows code that was written for an 8086 microprocessor (a predecessor to the 80386) to be executed in protected mode on the 80386. The code is run in a virtualized manner in an environment that appears to the code as an 8086 microprocessor.

The addressing scheme of the microprocessor differs with processor mode.

In protected mode, the 80386 microprocessor uses an addressing architecture, like that shown in FIG. 1. In protected mode, facilities for both segmentation and paging are used. Programs that are run on the 80386 microprocessor in protected mode use virtual addresses. Each virtual address includes a 16-bit selector 101 and a 32-bit offset 102. The selector 101 identifies a segment (i.e., a contiguous block of memory) in the virtual address s The offset 102 specifies an offset in the identified segment from the base address of the segment. The virtual address 100 is mapped by a segmentation system 103 into a 32-bit linear address 104. The resulting address 104 is known as a "linear" address because the address lies within a one dimensional or "linear" address space. In contrast, the virtual address space is a two-dimensional address space. The selector 101 of a virtual address specifies a first dimension (i.e., a segment), and the offset 102 of the virtual address specifies a second dimension. The linear address 104 is passed to a paging system 105, where the linear address is translated into a 32-bit physical address 106.

FIG. 2 shows the segmentation system 103 in more detail. As was mentioned above, the segmentation system 103 maps the virtual address 100 into a linear address 104. The segmentation system 103 includes at least one segment descriptor table 107. The segment descriptor table 107 is a table held in memory that includes entries containing information about segments of virtual memory. The 16-bit selector 101 of the virtual address 100 is used as an index into the segment descriptor table 107 to retrieve an entry 111. The specified entry 111 includes three fields: an attributes field 108, a limit field 109 and a base address field 110. The base address field 110 provides the base address of the segment associated with the entry. The limit field 109 specifies the length of the segment, and the attributes field 108 specifies the access rights of the segment (i.e., read, write or execute). The base address 110 is added to the 32-bit offset field 102 of the virtual address 100 to obtain the linear address 104.

Two types of segment descriptor tables are employed in protected mode on the 80386 microprocessor. First, a global descriptor table (GDT) is employed to hold descriptors pointing to segments of memory in the global address space that are accessible by all tasks run on the microprocessor. Second, a local descriptor table (LDT) is employed to point to memory segments that are local to a task. All other tasks may not access these local segments of memory.

The 80386 microprocessor provides segment registers for holding segment selectors, so that addressing may be performed by referencing the segment registers. In particular, virtual addresses are specified by a segment register and an offset. As shown in FIG. 3, the segment registers include a code segment register (CS), a stack segment register (SS), a main data segment register (DS) and three additional segment registers (ES, FS and GS).

The use of the segment registers CS, SS, DS, ES, FS and GS enhances system efficiency by eliminating the need to access a segment descriptor table 107 (FIG. 2) every time that address translation is performed. The 80386 provides a cache register for each segment register CS, SS, DS, ES, FS and GS (see FIG. 3). Each cache register contains the contents of the segment descriptor table entry that is indexed by the segment selector in the corresponding segment register. When a segment register is loaded with a segment selector, a CPU retrieves an entry from the segment descriptor table 107 (FIG. 2) using the segment selector as the index. The retrieved base address, limit and attributes fields of the retrieved entry are stored in the cache registers (FIG. 3). Thus, subsequent accesses to the segment need not retrieve the entry from the segment descriptor table 107 (FIG. 2); rather the contents of the entry may be obtained directly from the cache registers (FIG. 3).

FIG. 4 depicts the paging system 105 of FIG. 1 in more detail. The paging system 105 includes a CR3 control register 126, at least one page directory 118 and at least one page table 122. The paging system 105 is responsible for converting the linear address 104 into the physical address 106. The linear address 104 includes three fields: a directory index field 112 (Dir.), a page field 114 (Page) and an offset field 116 (Offset). The directory index field 112 is a 10-bit field that serves as an index into the page directory 118. The page field 114 is a 10-bit field that acts as an index into the page table 122, and the offset field 116 specifies an offset within a page frame.

The paging system 105 typically includes multiple page directories. The page directory 118 to be used in converting the linear address 104 into the physical address 106 is specified by the CR3 control register 126. The CR3 control register 126 is one of a number of control registers that are provided within the 80386 microprocessor. The directory index field 112 of the linear address 104 is used to specify an entry 120 in the page directory 118, which holds a pointer to the page table 122. Typically, the paging system 105 includes a number of page tables, and the entry 120 in the page directory 118 specifies which of the page tables is to be used.

The page field 114 of the linear address 104 is then used as an index to select an entry 124 in the page table 122. Entry 124 specifies the base address of a page frame 128 in physical memory. The base address of the page frame 128 is combined with the 12-bit offset field 116 to generate the physical address 106. The page frame base address forms the most significant 20 bits of the physical address 106, whereas the offset field 116 forms the least significant 12 bits of the physical address 106.

The 80386 microprocessor is designed to support multi-tasking. Multi-tasking refers to when multiple tasks are run concurrently on a CPU under the control of an operating system. Typically, each task is given a time slice in which it is allowed to execute on the CPU before the next task is run on the CPU. The net result is that there are multiple tasks in various stages of execution which cooperatively share the CPU under the control of the operating system.

Many data processing systems include more than one CPU. These systems are generally referred to as "multi-processor systems." In general, the CPUs of a multi-processor system execute independently. As such, the CPUs are often used to run separate tasks in parallel.

An operating system run on a multi-processor system maintains CPU-specific data for each CPU. The CPU-specific data is data that the operating system must maintain on a per-CPU basis. CPU-specific data includes data such as the identity of a task that is currently executing on a CPU. The CPU-specific data must be accessible to the operating system at any time and must be cheaply accessible, as it is used frequently.

SUMMARY OF THE INVENTION

It is, therefore, an object of the present invention to provide an approach for storing CPU-specific data in a multi-tasking, multi-threading operating system that is run on a multi-processor system.

It is a further object of the present invention to allow access to CPU-specific data in a very fast manner with minimal memory use.

It is another object of the present invention to allow access to CPU-specific data in a manner that allows use of a single system image (i.e., use of common virtual addresses on all CPUs in a system).

It is yet another object of the present invention to segregate CPU-specific data from shared task information in a multi-tasking, multi-threading operating system that is run on a multi-processor system.

The foregoing and other objects are realized by the present invention. In accordance with one aspect of the present invention, a method of segregating CPU-specific data from shared task information is practiced in a multi-processor system. The multi-processor system includes a memory and at least two CPUs which execute different threads of computation of the task. In accordance with this method, the shared task information is placed in memory locations of the memory that are accessible by both of the CPUs. The CPU-specific data is placed in memory locations that are directly addressable only by the associated CPU. In other words, these memory locations are only visible to the CPU whose CPU-specific data is stored in the memory locations.

In accordance with another aspect of the present invention, a method is practiced in a multi-processor system having a memory and multiple CPUs. Multiple threads of a task are executed across the multiple CPUs. In accordance with the method, global descriptor tables are provided in memory for address translation. A unique one of the global descriptor tables is associated with each CPU. Each global descriptor table includes indexed entries that point to memory segments that are globally accessible to threads of computation executed on the associated CPU. Like indexed entries in the respective global descriptor tables are filled with identical entries. However, at least one like indexed entry in each global descriptor table is filled with a segment selector that points to a segment in the memory holding CPU-specific data. Thus, although the CPU-specific data is held in the global memory space that is accessible by all of the CPUs, the CPU-specific data is only visible to the associated CPU.

In accordance with still another aspect of the present invention, a multi-processor system has at least two CPUs for executing separate threads of computation of a task. The multi-processor system also has a memory, that is logically divided into memory segments. The multi-processor system runs a multi-threading operating system on the CPUs to control the processors. A global descriptor table is held in memory for each CPU. The global descriptor tables are used by the operating system in address translation. Each global descriptor table holds entries that point to memory segments that are accessible to all tasks. Furthermore, each global descriptor table includes at least one entry that points to a memory segment that holds CPU-specific information that is directly addressable only by the associated CPU.

In accordance with an additional aspect of the present invention, a method of accessing CPU-specific data is practiced in a data processing system. The data processing system includes multiple CPUs and a memory that is logically partitioned into segments. In accordance with this method, a descriptor table for use in address translation is stored in memory for each CPU. Each descriptor table includes like indexed entries that include descriptors. The descriptors point to segments of memory that are accessible to threads executed by the CPUs. Each descriptor table also includes at least one entry having a descriptor that points to a segment holding CPU-specific data for the associated CPU. The entry in the descriptor table that points to the CPU-specific data is accessed to obtain a descriptor for the segment holding the CPU-specific data. The descriptor is then used to obtain an address for the CPU-specific data, and subsequently, the address is used to access the CPU-specific data.

The data processing system in which the method is practiced may include a register for holding an index into the descriptor table. When such a register is employed in the data processing system, the method may include the additional step of using the register to obtain an index of the entry in the descriptor table which holds CPU-specific data. A descriptor table may be a global descriptor table, and the register may be a segment register.

In accordance with still yet another aspect of the present invention, a method is practiced in the data processing system having a memory that is logically partitioned into segments and multiple CPUs executing separate threads of a task. In accordance with this method, a page directory is provided in memory, and the page directory is local to the task and includes entries that hold a pointer to a page table. A global descriptor table is provided in memory for each CPU. The global descriptor table is used in translating a virtual address, having a selector and an offset, into a linear address. Each global descriptor table holds like entries at like indexes and holds at least one entry at a like index that includes a descriptor for a segment of memory holding CPU-specific data.

A selector in a virtual address is used as an index to access the entry in a global descriptor table of a CPU which holds the descriptor for the segment of memory holding CPU-specific data. The descriptor includes a base address of the segment of memory that holds the CPU-specific data. An offset in the virtual address is added to the base address of the segment of memory holding the CPU-specific data to obtain a linear address. Bits in the linear address are used as an index into the page directory to obtain a pointer to a page table that is to be used in address translation. The bits in the linear address are used as an index into the page table. These bits specify an entry holding a page frame address. The page frame address is combined with offset bits in the linear address to obtain a physical address. The physical address is used to access a memory location in the segment of memory holding the CPU-specific data.

FIG. *5a* is a block diagram illustrating how CPU-specific data may be stored in physical memory for a multi-tasking operating system, which differs from the preferred embodiment of the present invention described herein in that it does not support multi-threading.

FIG. *5b* is a block diagram illustrating the problem of adopting the approach shown in FIG. *5a*, when a single image of a multi-threading operating system is run on a multi-processor system.

Figure 6:
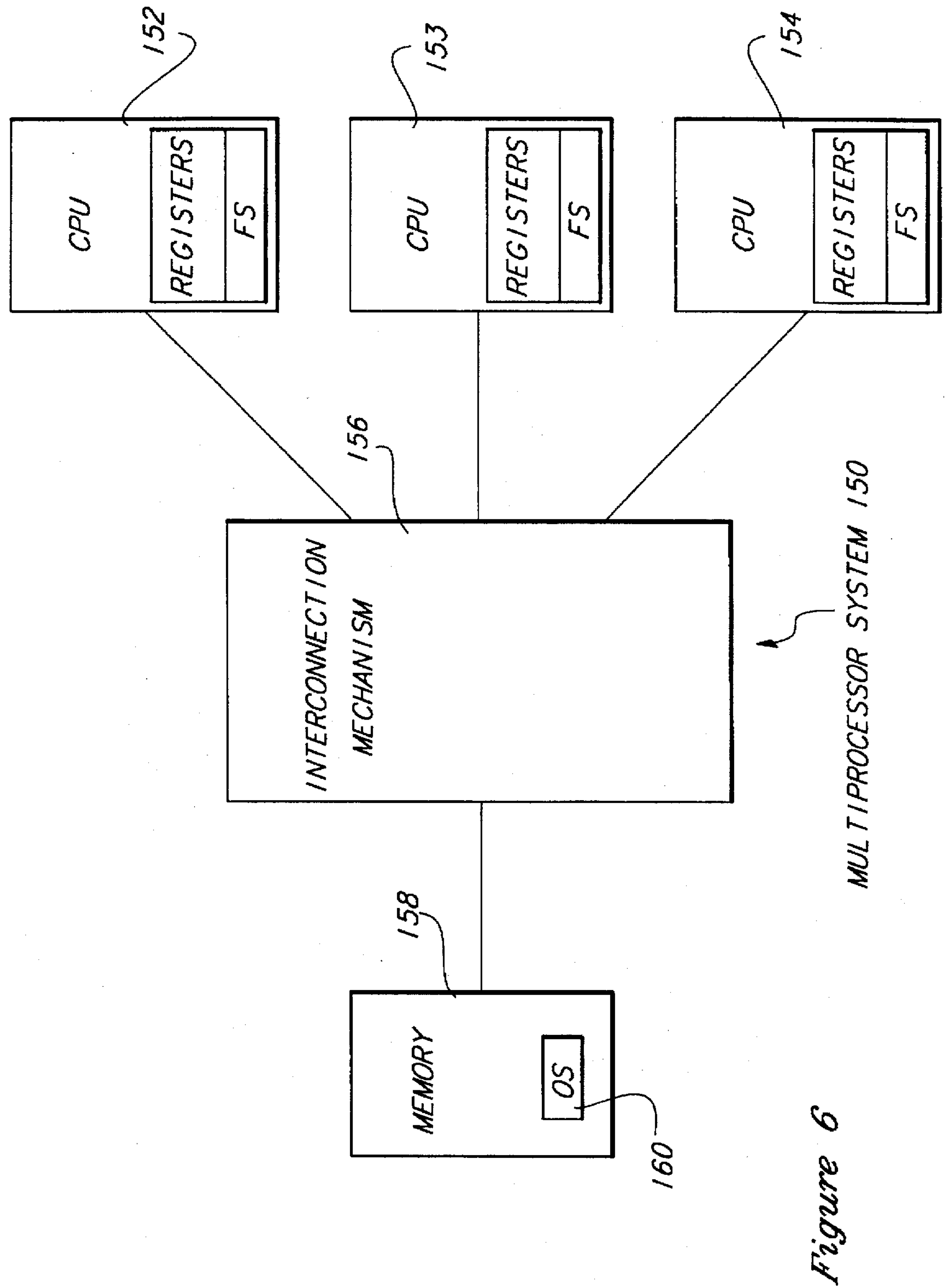

FIG. 6 is a block diagram of an illustrative multi-processor system on which a preferred embodiment of the present invention may be implemented.

Figure 7:
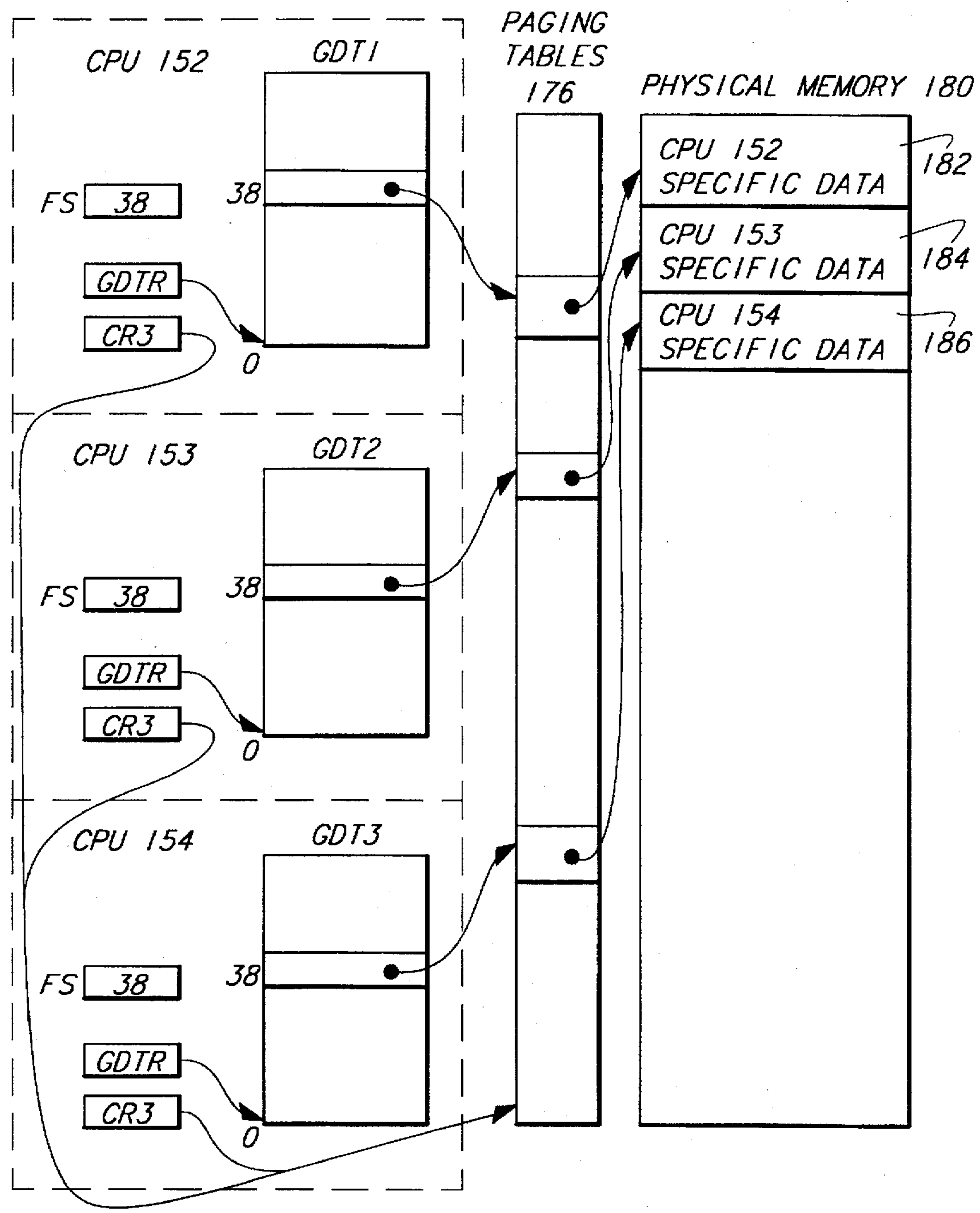

FIG. 7 is a block diagram illustrating segregation of CPU-specific data in the preferred embodiment of the present invention described herein.

DETAILED DESCRIPTION OF THE INVENTION

The present invention will now be described with reference to a preferred embodiment that provides separate storage of CPU-specific data by multiple CPUs of a multi-processor system in an operating system that supports multi-tasking and multi-threading. CPU-specific data refers to data, like that described above, and additionally refers, in the preferred embodiment described herein, to information such as the identity of the thread currently executing on a CPU. The preferred embodiment of the present invention described herein uses GDTs to enable each CPU to store CPU-specific data in a multi-threading environment without requiring additional hardware and without substantially increasing memory requirements.

Figure 4:
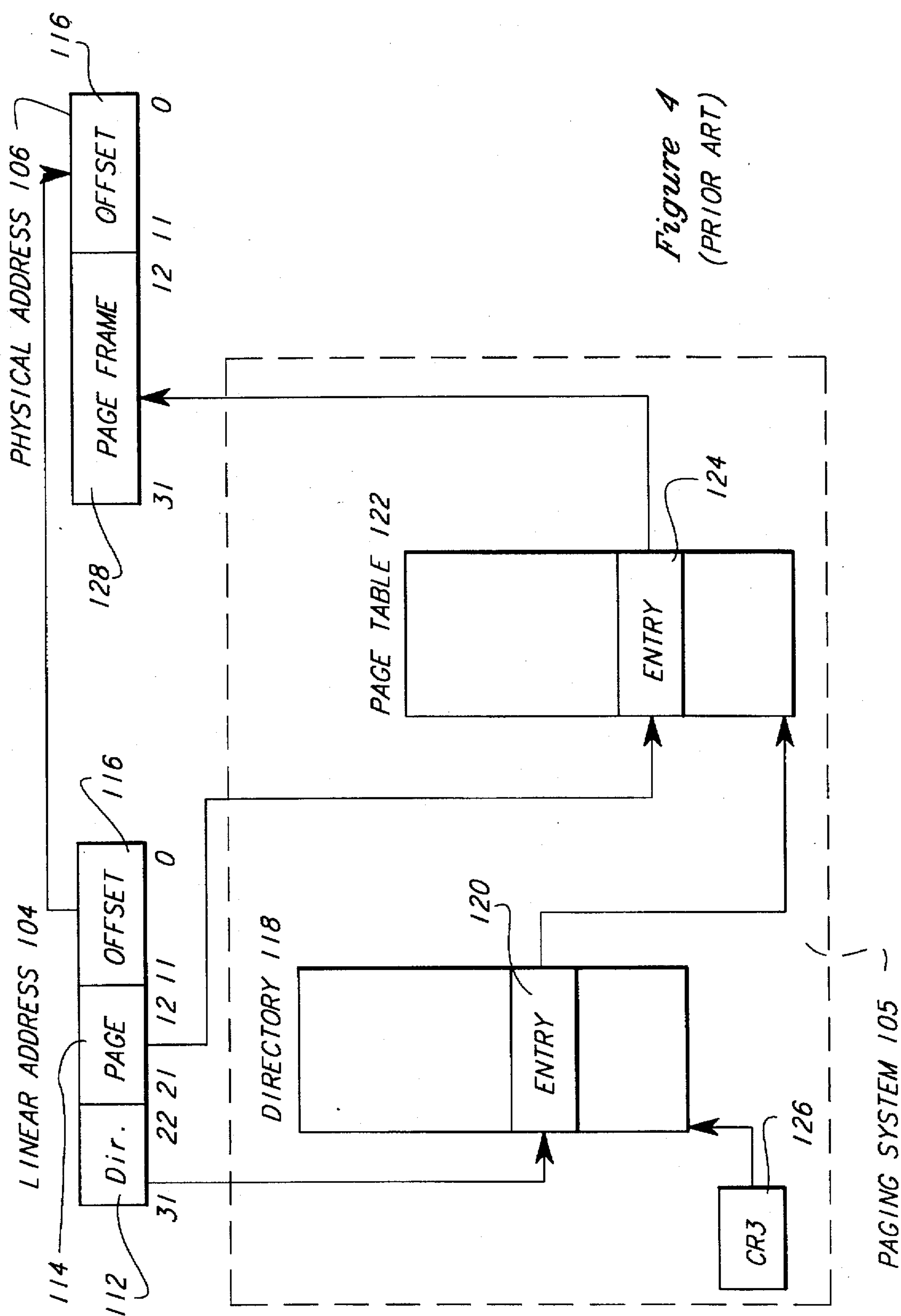
FIG. 4 is a more detailed block diagram of the paging system 105 of FIG. 1.
Figure 5A:
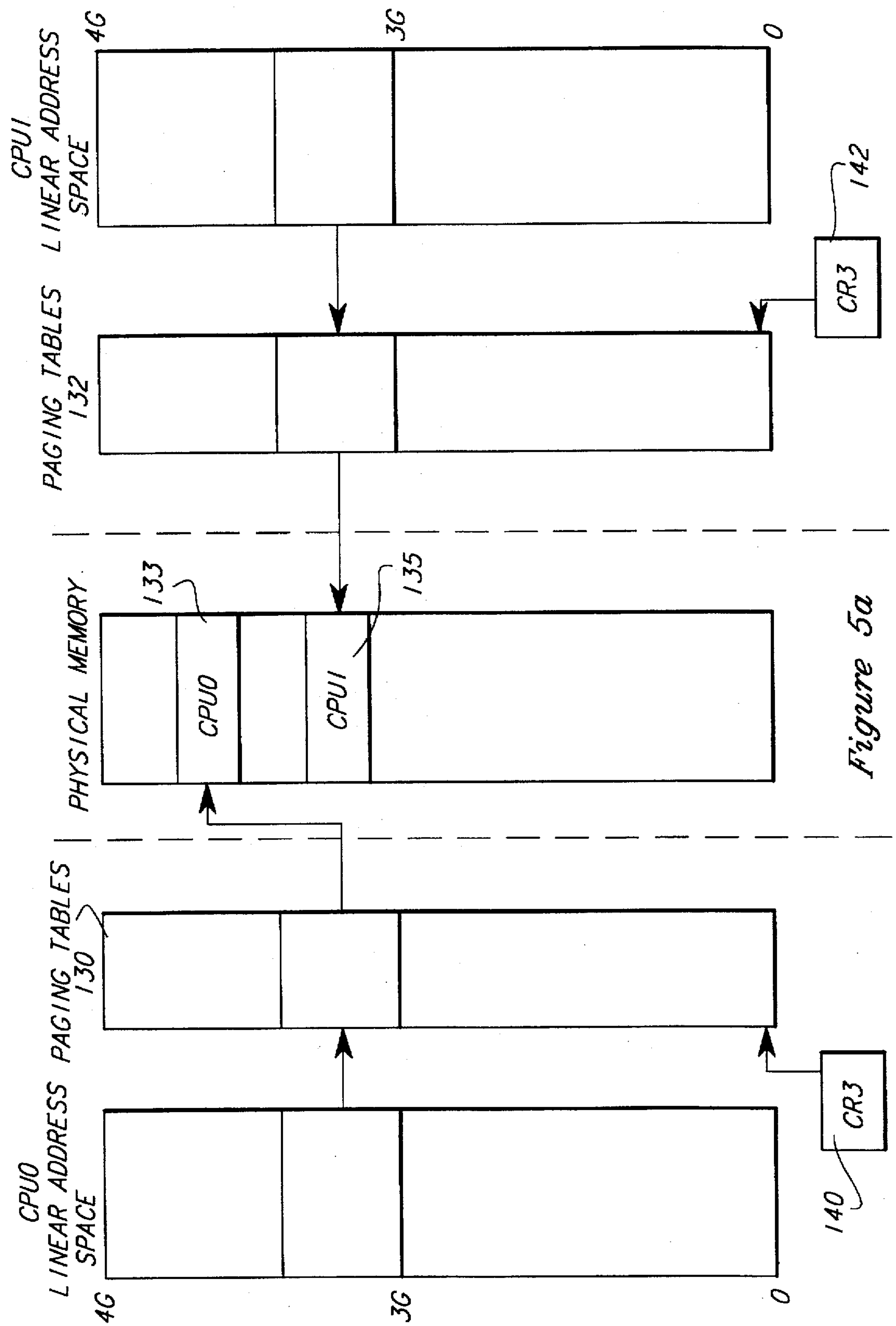
Figure 5B:
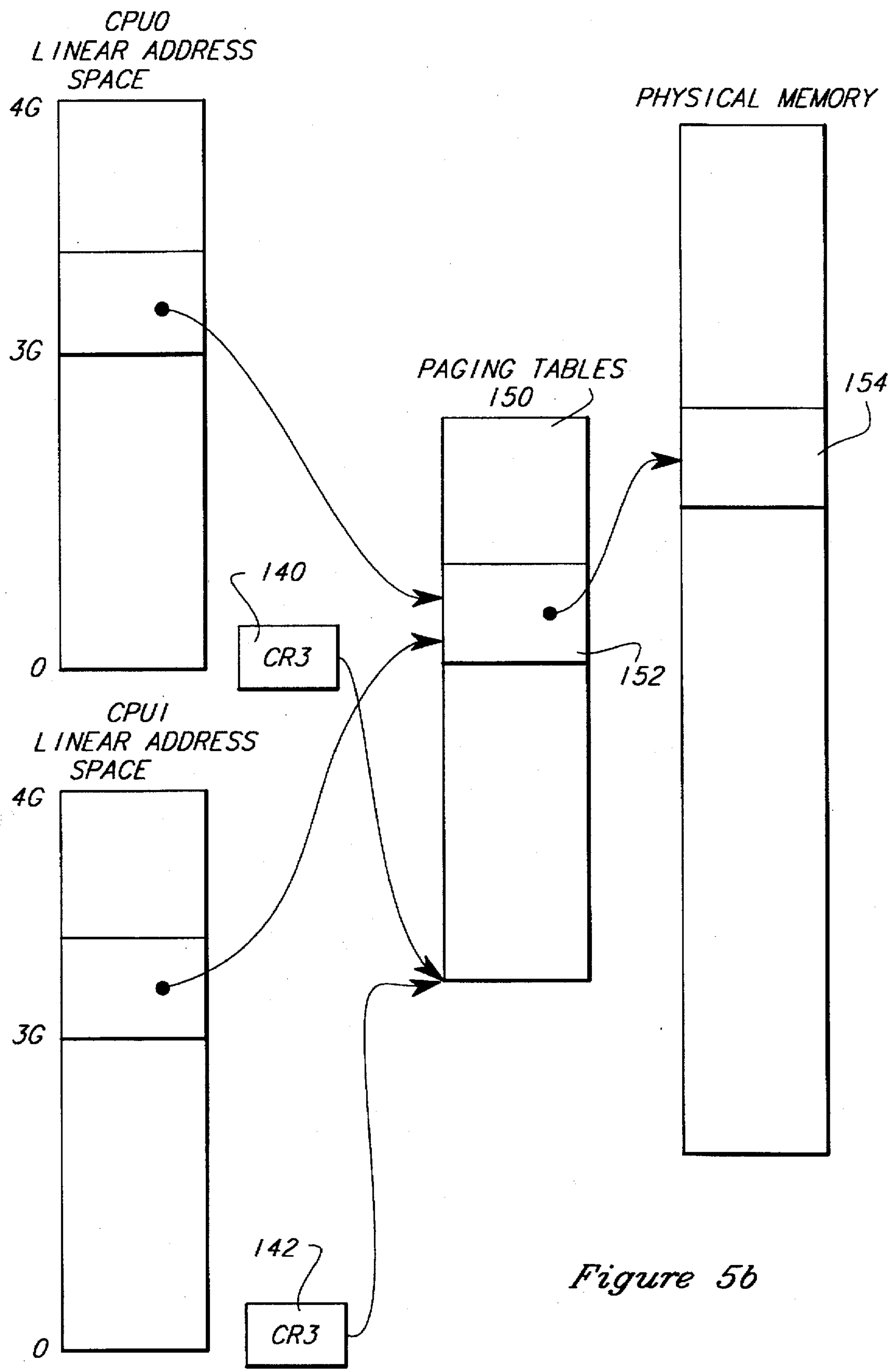

FIG. *5a* provides an example of how CPU-specific data may be stored in an operating system that supports multi-tasking but not multi-threading. This approach should not be confused with the preferred embodiment of the present invention described herein. Rather, this approach is shown to illustrate the limitations posed by such an approach. The solution set forth in FIG. *5a* stores CPU-specific data for a CPU in memory that is local to the task being run on the CPU. The operating system is run on a multi-processor system having two CPUs, CPU0 and CPU1, that are executing distinct tasks. It should be noted that the phrase "paging tables" is used herein to refer to the combination of a page table and a page directory, as shown in FIG. 4, for specifying a page frame in physical memory. Paging tables are allocated on a per-task basis; hence, the task run on CPU0 and the task run on CPU1 use different sets of paging tables 130 and 132. The CR3 registers 140 and 142 of CPU0 and CPU1 point to their respective sets of paging tables 130 and 132 (i.e., to the page directories in the paging tables). The CR3 register 140 of CPU0 points to paging tables 130, and the CR3 register 142 of CPU1 points to paging tables 132. The CPU-specific data of CPU0 and CPU1 are both stored at linear address "3G" (where G indicates gigabytes). This same linear address, however, is mapped to different page frames in physical memory by the respective paging tables 130 and 132. Thus, the CPU-specific data for CPU0 is stored in page frame 133 of physical memory, and the CPU-specific data for CPU1 is stored in page frame 135 of physical memory.

The above-described scheme only works well in operating systems that do not support multi-threading. In operating systems that support multi-threading, a single task may include multiple threads that are distributed across the CPUs of the data processing system. Hence, at any point in time, different threads of a single task may be running concurrently on different CPUs.

FIG. *5b* illustrates why the above-described scheme will not work in a system having a single image of a multi-threading operating system run on a multi-processor system. Suppose that a first thread of a task is executing on CPU0 and a second thread of the same task is executing on CPU1. Because these threads of computation are part of the same task, the CR3 register 140 of CPUO and the CR3 register 142 of CPU1 both point to the same paging tables 150. Accordingly, the common linear address for the CPU-specific data is mapped to the same paging tables entries 152 for both CPUs. The entries 152 point to a common page frame 154 in physical memory. Therefore, the CPU-specific data of only one of the CPUs may be mapped into the linear address space of the task. This means that the other processor cannot access its CPU-specific data.

A preferred embodiment of the present invention will be described below with reference to a multi-processor system employing INTEL 80386 microprocessors. It should be appreciated that the multi-processor system that is described below is merely illustrative. Those skilled in the art will appreciate that other types of processors (such as an 80286) may be employed and that other multi-processor configurations may be employed.

Figure 1:
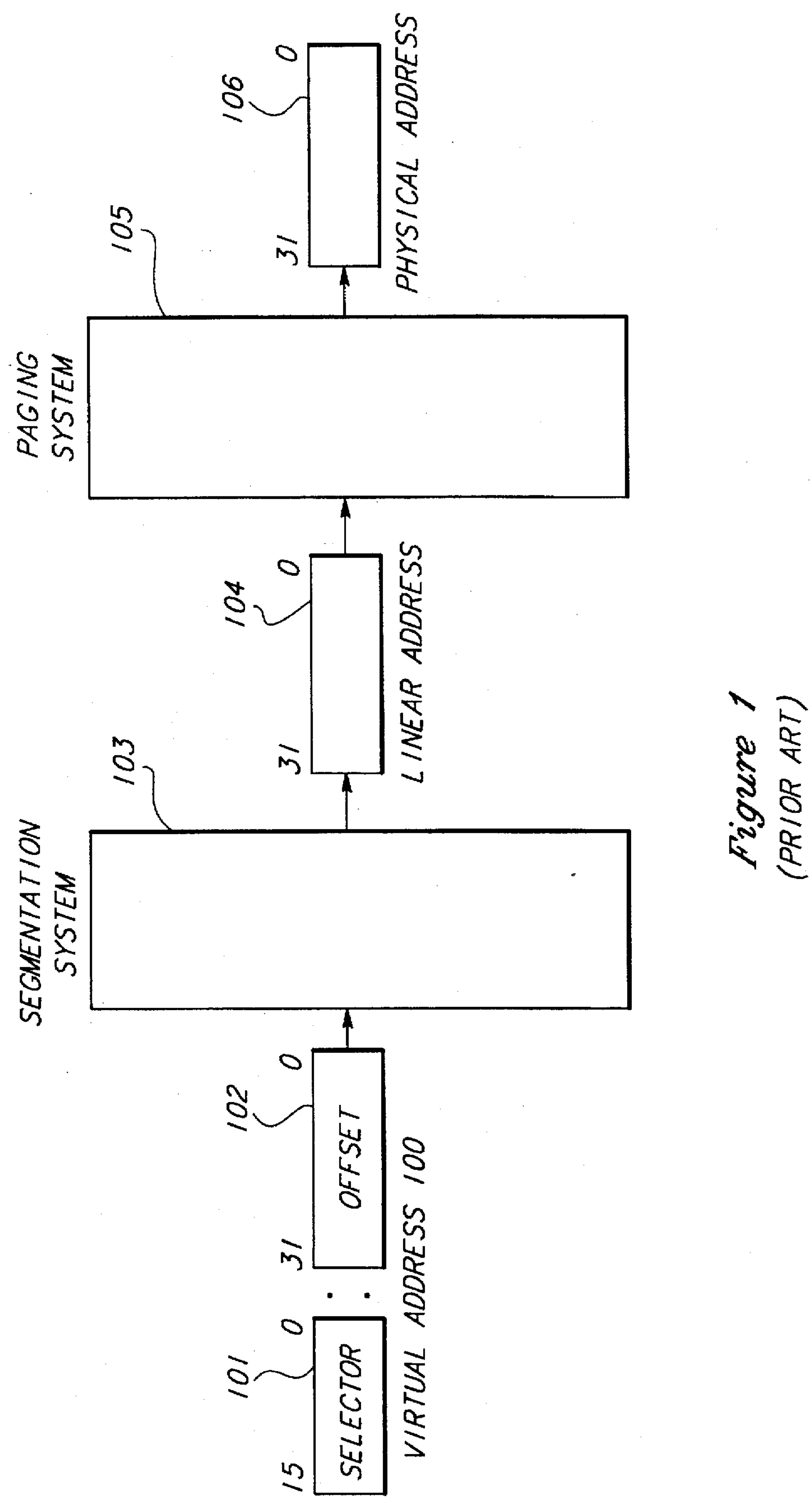
FIG. 1 is a block diagram of the addressing architecture of a conventional 80386 microprocessor.
Figure 2:
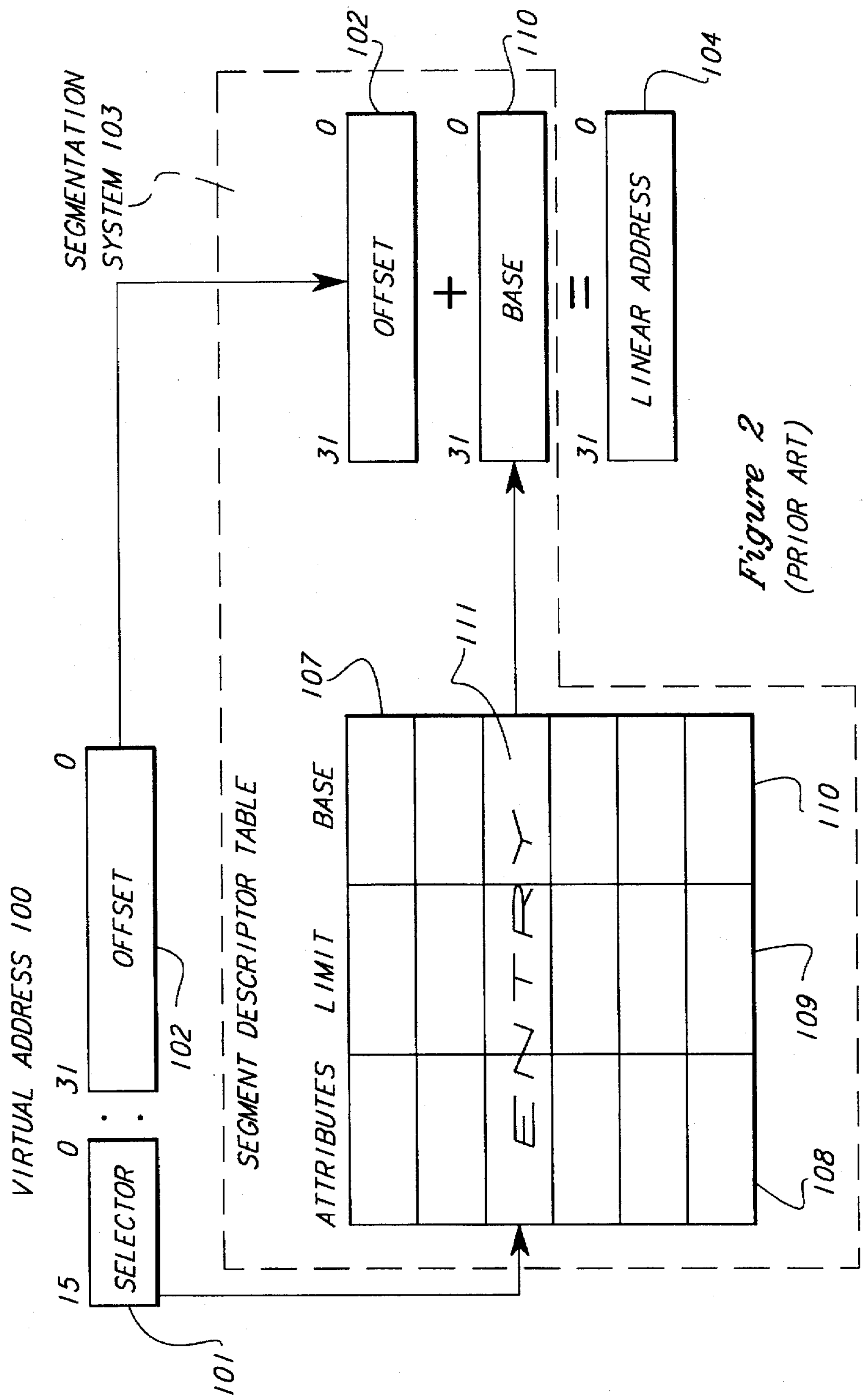
FIG. 2 is a block diagram illustrating the segmentation system 103 of FIG. 1 in more detail.
Figure 3:
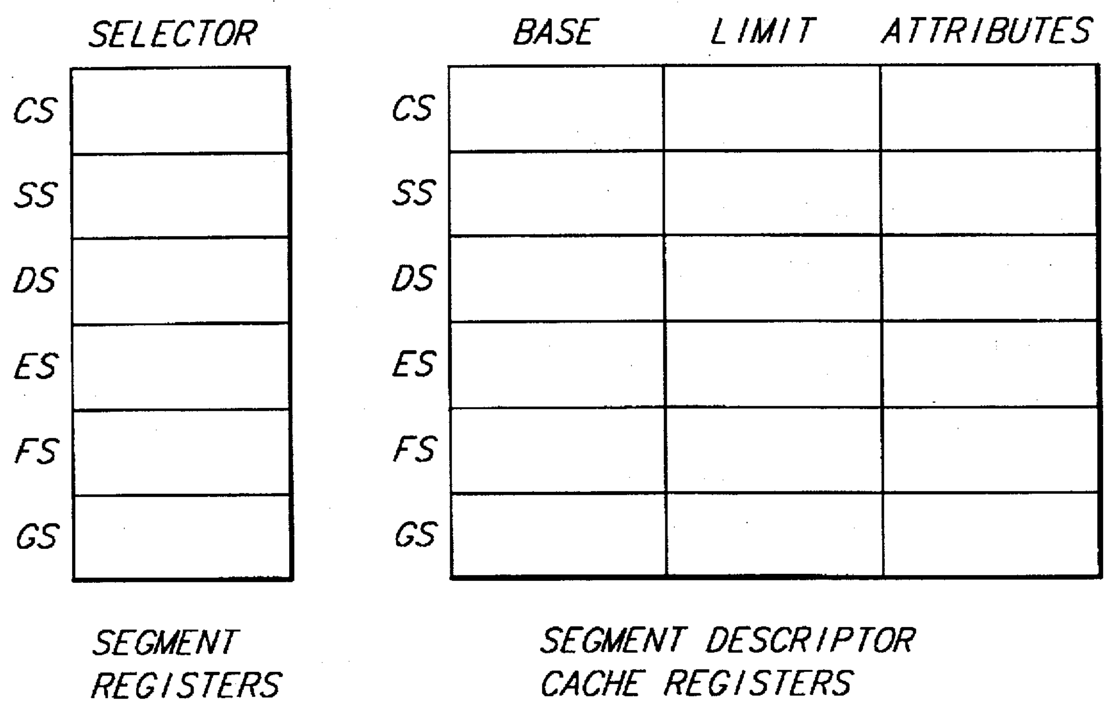
FIG. 3 is a block diagram of the segment registers and segment descriptor cache registers of a conventional 80386 microprocessor.

FIG. 6 depicts an illustrative multi-processor system 150 for practicing the preferred embodiment of the present invention described herein. The multi-processor system 150 includes three CPUs 152, 153 and 154. CPUs 152, 153 and 154 use an addressing architecture like that shown in FIGS. 1–4 when operating in 80386 protected mode. Each CPU 152, 153 and 154 includes registers, such as the segment registers CS, SS, DS, ES, FS and GS as shown in FIG. 3. CPUs 152, 153 and 154 are interconnected with each other and with a memory 158 via an interconnection mechanism 156. The interconnection mechanism 156 may be an interconnection network, bus or other suitable interconnection means.

The multi-processor system 150 executes instructions under the control of a multi-threading operating system 160, that is held in memory 158. This operating system 160 allows multiple threads of a single task to be run in parallel on the respective CPUs 152, 153 and 154. For instance, a first thread of a task may run on CPU 152, while a second thread runs on CPU 153 and a third thread runs on CPU 154.

FIG. 7 illustrates the approach adopted by a preferred embodiment of the present invention described herein to allow CPU-specific data to be stored by the operating system. In the preferred embodiment described herein, a separate GDT is provided for each CPU. GDT1 is provided for CPU 152, GDT2 is provided for CPU 153 and GDT3 is provided for CPU 154. GDT1, GDT2 and GDT3 are used for translation from the virtual address space to the linear address space in a fashion analogous to that described above for the conventional system. At initialization time, the GDTR of each CPU 152, 153 and 154 is filled with a pointer to the GDT for the associated CPU. A particular like-indexed entry for each GDT differs and points to a segment holding CPU-specific data for the associated CPU. The selectors in these like-indexed entries are used by the operating system to access the CPU-specific data for CPU0, CPU1 and CPU2. It should be appreciated that GDT1, GDT2 and GDT3 may also have additional like-indexed entries that hold different selectors. For instance, additional like-indexed entries may hold descriptors for segments holding thread-specific data.

When the operating system seeks to access CPU-specific data, it uses the FS segment register. If the operating system is running and the system is entering kernel space via a trap, the FS segment register is automatically loaded with a constant value, such as "38." This constant value is an index to a GDT entry holding a descriptor for the segment that holds CPU-specific data. Thus, if the operating system needs to access a memory location in the segment that holds CPU-specific data, it uses an address specified as FS:Offset. By adopting such an approach, the single image of the operating system uses the same virtual address on all CPUs to access CPU-specific data.

In contrast, when the operating system is not running and user memory space is being accessed, the FS register is loaded with a different constant value. This constant value is an index to a GDT entry holding a descriptor for a segment in which a thread environment block is stored. Thus, thread-specific data for each is stored at the same virtual address. The thread environment block may be accessed using the FS segment register in a fashion analogous to that described above for the operating system.

The use of the FS segment register as an index is merely illustrative, and storing a constant value of "38" in the register when accessing kernel space is also merely illustrative. Those skilled in the art will appreciate that other registers and other suitable selector values may be used.

Suppose that the operating system is running so that the FS segment register has a value of "38" stored in it. The entry at index "38" of GDT1, the entry at index "38" of GDT2 and the entry at index "38" of GDT3 each point to different sets of entries in the paging tables 176, and each set of entries is mapped into a different page frame in physical memory 180. The entry at index "38" of GDT1 is mapped to page frame 182, which holds the per-CPU data for CPU 152. The entry at index "38" of GDT2 is mapped to page frame 184, which holds per-CPU data for CPU 153, and the entry at index "38" of GDT3 is mapped to page frame 186, which holds per-CPU data for CPU 154. Hence, GDT1, GDT2 and GDT3 are used to store the CPU-specific data for the respective CPUs in different page frames of physical memory but at the same virtual address. Thus, the CPU-specific data for each CPU is only directly addressable and visible by the associated CPU. The problems associated with having a common page table for multiple threads are overcome.

By using GDT1, GDT2 and GDT3 in this manner, no added hardware is required to store CPU-specific data in a multi-threading environment. In addition, since GDTs are part of a flat memory space, they occupy little memory space. Hence, the memory overhead incurred to realize the present invention is miniscule. The run-time cost for the present invention is also miniscule.

While the present invention has been described with reference to a preferred embodiment thereof, those skilled in the art will know of various changes in form and scope that may be made without departing from the spirit of the claim invention as defined in the appended claims. For instance, the present invention need not be used in a paged system; rather, it may also be used in non-paged system.

I claim:

1. In a multi-processor system having a memory and multiple central processing units (CPUs) wherein multiple threads of a task are executed across the multiple CPUs, a method of segregating thread-specific data from shared task information, comprising the steps of:

(a) providing global descriptor tables in memory for address translation wherein each CPU has a unique one of the global descriptor tables associated with it that includes entries indexed by an index value which point to memory segments that are directly addressable by the threads of the task executed on the CPU;

(b) filling entries with same index values in the respective global descriptor tables with identical entries; and (c) filling at least one selected entry in each global descriptor table with a segment selector that points to a segment in memory holding thread-specific data that identifies which of the threads is being run on the CPU with which the global descriptor table is associated, each said selected entry having a same index value.

2. A method as recited in claim 1 wherein each CPU has a register and said method further comprising the steps of:

for each CPU, loading the register with a selector that serves as an index value for an entry in the descriptor table associated with the CPU, said entry pointing to the segment in memory holding thread-specific data;

maintaining the respective selectors in the respective registers whenever an operating system is running on the CPU; and using the register to gain access to the CPU-specific data.

3. In a multi-processor system having at least two central processing units (CPUs) for executing separate threads of computation of a task and a memory divided into memory segments, a system comprising:

(a) a multi-threading operating system run on said CPUs to control said CPUs; and (b) for each CPU, a global descriptor table held in memory and used by the operating system in address translation, each said global descriptor table holding entries that point to memory segments that are accessible to all of the threads of computation and at least one entry that points to a memory segment holding thread-specific information that identifies the thread currently being run on the CPU and which is directly addressable only by said CPU.

4. A system as recited in claim 3, further comprising, for each CPU, a register holding an index that is used to access the entry in the global descriptor table that points to a memory segment holding thread-specific information.

5. In a data processing system having multiple central processing units (CPUs) running threads of computation and a memory that is logically partitioned into segments, a method of accessing thread-specific data, comprising the steps of:

(a) storing a global descriptor table for use in address translation in memory for each CPU wherein each global descriptor table includes like indexed entries that hold descriptors which point to segments of memory that are directly addressable to threads executed on the CPU and also includes a like-indexed entry holding a descriptor that points to a segment holding thread-specific data for a thread that is currently being run on the CPU, said thread-specific data identifying the thread being run on the CPU;

(b) accessing the entry in one of the global descriptor tables that points to thread-specific data to obtain a descriptor for the segment holding the thread-specific data for one of the CPUs;

(c) using the descriptor for the thread-specific data to obtain an address of the thread-specific data; and (d) using the address of the thread-specific data to access the thread-specific data.

6. A method as recited in claim 5 wherein the data processing system includes a register for holding an index into the descriptor table and said method, further comprising the step of using the register to obtain an index of the entry in the descriptor table which holds thread-specific data.

7. A method as recited in claim 6 wherein the register is a segment register.

8. In a data processing system having a memory, that is logically partitioned into segments, and multiple central processing units (CPUs) executing separate threads of a task, a method, comprising the steps of:

a) providing a page directory in memory wherein said page directory is local to said task and includes entries that each hold a pointer to a page table;

b) providing, for each CPU, a global descriptor table in memory for use in translating a virtual address, having a selector and an offset, into a linear address, each said global descriptor table holding like entries at like indexes and holding at least one entry at a like index that includes a descriptor for a segment of memory holding thread-specific data for the thread currently being run on the CPU;

c) using a selector of a virtual address as an index to access the entry in a global descriptor table of a CPU which holds the descriptor for the segment of memory holding thread-specific data, said descriptor including a base address of the segment of memory holding the thread-specific data;

d) adding an offset in the virtual address to the base address of the segment of memory holding the thread-specific data to obtain a linear address;

e) using bits in the linear address as an index into the page directory to obtain a pointer to a page table;

f) using bits in the linear address as an index into the page table to obtain a page frame address;

g) combining the page frame address with offset bits in the linear address to obtain a physical address; and h) using the physical address to access a memory location in the segment of memory holding the thread-specific data.

9. A computer-readable storage medium for use in a multi-processor system having a memory and multiple central processing units (CPUs) wherein threads of a task are executed across the CPUs and the memory holds global descriptor tables for address translation such that each CPU has a unique one of the global descriptor tables associated with it that includes entries indexed by an index value which point to memory segments that are directly addressable by the threads of the task executed on the CPU, said medium holding instructions for:

(a) providing global descriptor tables in memory for address translation wherein each CPU has a unique one of the global descriptor tables associated with it that includes entries indexed by an index value which point to memory segments that are directly addressable by the threads of the task executed on the CPU;

(b) filling entries with same index values in the respective global descriptor tables with identical entries; and (c) filling at least one selected entry in each global descriptor table with a segment selector that points to a segment in memory holding thread-specific data that identifies which of the threads is being run on the CPU with which the global descriptor table is associated, each said selected entry having a same index value.

10. A computer-readable storage medium for use in a multi-processor system having at least two central processing units (CPUs) for executing separate threads of a task and a memory that is divided into memory segments, said medium holding:

(a) a multi-threading operating system run on said CPUs to control said CPUs; and (b) for each CPU, a global descriptor table held in memory and used by the operating system in address translation, each said global descriptor table holding entries that point to memory segments that are accessible to all of the threads of computation and at least one entry that points to a memory segment holding thread-specific information that identifies the thread currently being run on the CPU and which is directly addressable only by said CPU.

11. A computer-readable storage medium for use in a data processing system having multiple central processing units (CPUs) running threads of computation and a memory that is logically partitioned into segments, said medium holding instructions for:

(a) storing a global descriptor table for use in address translation in memory for each CPU wherein each global descriptor table includes like indexed entries that hold descriptors which point to segments of memory that are directly addressable to threads executed on the CPU and also includes a like-indexed entry holding a descriptor that points to a segment holding thread-specific data for a thread that is currently being run on the CPU, said thread-specific data identifying the thread being run on the CPU;

(b) accessing the entry in one of the global descriptor tables that points to thread-specific data to obtain a descriptor for the segment holding the thread-specific data for one of the CPUs;

(c) using the descriptor for the thread-specific data to obtain an address of the thread-specific data; and (d) using the address of the thread-specific data to access the threadspecific data.

* * * * *